United States Patent [19]

Gottschlich et al.

[11] 4,083,844
[45] Apr. 11, 1978

[54] PHENYLAZO ORTHOCYANO PHENYLAZO OR ORTHOCYANO PHENYLAZO PHENYLAZO CONTAINING DYESTUFFS

[75] Inventors: Alois Gottschlich; Klaus Leverenz, both of Leverkusen, Germany

[73] Assignee: Bayer Aktiengesellschaft, Leverkusen, Germany

[21] Appl. No.: 453,418

[22] Filed: Mar. 21, 1974

Related U.S. Application Data

[63] Continuation of Ser. No. 765,668, Oct. 7, 1968, abandoned.

[30] Foreign Application Priority Data

Oct. 10, 1967 Germany .............................. F 53720

[51] Int. Cl.$^2$ ..................... C09B 43/00; D06P 1/04; D06P 1/18; D06P 3/54
[52] U.S. Cl. .................................... 260/174; 260/156; 260/158; 260/186; 260/187; 260/205; 260/208; 260/296 R; 260/465 E; 260/551 S; 260/556 A; 260/562 R; 260/567.6 M; 260/569; 260/570.5 P; 260/571; 260/573; 260/574; 260/575; 260/578; 560/158; 560/250
[58] Field of Search ............... 260/186, 174, 184, 185, 260/191, 190, 187

[56] References Cited

U.S. PATENT DOCUMENTS 2,195,076  3/1940  Braun et al. .......................... 260/465
3,393,191  7/1968  Mueller ................................ 260/205

OTHER PUBLICATIONS

Bacon et al., J. Chem. Soc. (London), vol. of 1964, pp. 1097 to 1107.

Primary Examiner—Floyd D. Higel
Attorney, Agent, or Firm—Plumley and Tyner

[57] ABSTRACT

Disazo dyestuffs of the formula

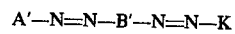

are disclosed in which
A' is an aromatic carbocyclic or aromatic heterocyclic radical;
B' is aromatic carbocyclic and at least one of A' and B' carries a cyano group ortho to the azo group; and
K is the radical of a coupling component, e.g. parahydroxyaryl or N-substituted paraaminoaryl radicals.

These dyestuffs are useful for dyeing synthetic hydrophobic materials such as polyesters, cellulose triacetate, polyamides, polyolefins, polyurethanes and polymers and copolymers of acrylonitrile to give greenish-blue to bluish-red shades with good fastness properties.

5 Claims, No Drawings

PHENYLAZO ORTHOCYANO PHENYLAZO OR ORTHOCYANO PHENYLAZO PHENYLAZO CONTAINING DYESTUFFS

This is a continuation of application, Ser. No. 765,668, filed Oct. 7, 1968 and now abandoned.

The object of the present invention comprises new disazo dyestuffs of the formula

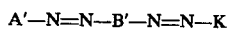  (I)

in which A' stands for an aromatic-carbocyclic or aromatic-heterocyclic radical and B' stands for an aromatic-carbocyclic radical and at least one of the radicals A' and B' carries a cyano group in the o-position to the azo group; K denotes the radical of a coupling component, preferably a p-hydroxy-aryl or a N-substituted p-amino-aryl radical,
and a process for the production thereof.

The radicals A', B' and K may otherwise contain further substituents which are customary for azo dyestuffs, for example, halogen; alkyl, aralkyl, aryl, alkoxy, nitro, cyano, trifluoroalkyl, sulphone, acylamino, acyl groups; primary, secondary and tertiary amino groups; hydroxyl, carboxylic acid, carboxylic acid ester, optionally N-substituted carboxylic acid amide or sulphonic acid amide groups.

A class of preferred dyestuffs comprises those of the formula

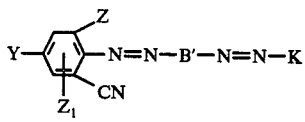  (II)

in which Y denotes hydrogen or a group $-NO_2$, $-CN$, $-R_1$, $-OR_1$, $-CF_3$, $-SO_2R_1$,

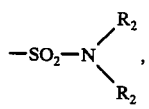

F, Cl, Br,

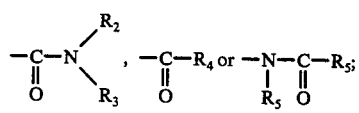

$R_1$ stands for an optionally substituted alkyl, aralkyl or aryl radical; $R_2$ and $R_3$ stand for hydrogen or for substituents which may be identical or different and together may be part of a heterocyclic ring; $R_4$ is hydrogen, $-OH$, the radical $-R_1$ or $-OR_1$; and $R_5$ is hydrogen or the radical $-R_1$; Z and $Z_1$ stand for hydrogen or a substituent, preferably the groups $-NO_2$, $-CN$, $-R_1$, $OR_1$, $-CF_3$, $-SO_2-R_1$,

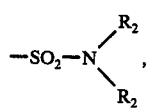

Cl, Br and

and B' and K have the same meaning as above.

Within the class of dyestuffs of the formula (II) there may be mentioned those of the formula

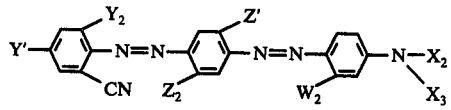

where
Y' is $CH_3$, Br, or $NO_2$;
$Y_2$ is CN or Cl;
Z' is H, $CH_3$ or $OCH_3$;
$Z_2$ is H or $CH_3$;
$W_2$ is H, $CH_3$ or $NHCOCH_3$;
$X_2$ is $C_2H_5$ or $C_4H_9$; and
$X_3$ is $C_2H_5$ or $C_2H_4OH$.

Another class of preferred dyestuffs comprises those of the formula

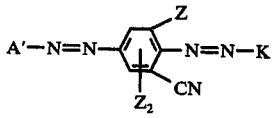  (III)

in which $Z_2$ stands for hydrogen, alkyl, alkoxy, halogen or the group

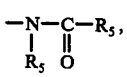

and A', K, Z and $R_5$ have the same meaning as above.

Within the class of dyestuffs of the formula (III) there may be mentioned those of the formula

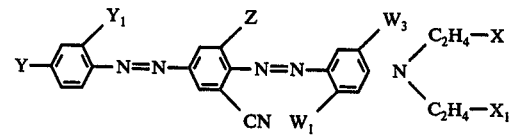

where
Y is H, Cl, $CH_3$, $NO_2$;
$Y_1$ is H, $CH_3$;
Z is $CH_3$, $OCH_3$, Cl, CN;
$W_1$ is H, $CH_3$, $NHCOCH_3$, $NHCOCH_2-OCOCH_3$;
$W_3$ is H or $OC_2H_5$;
X is H, $C_2H_5$, $-OCOOCH_3$ or $OCOCH_3$; and
$X_1$ is H, OH, $COOCH_3$, $OCOCH_3$ or $OCOOCH_3$.

Another class of dyestuffs of the formula (III) which can be mentioned are dyestuffs of the formula

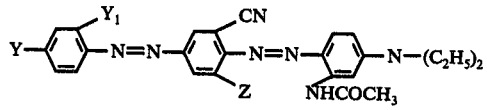

where
Z is $CH_3$, $OCH_3$, Cl, or CN;
Y is H, $CH_3$, or $NO_2$; and
$Y_1$ is H or $CH_3$.

Preferred dyestuffs of the formula (II) are those of the formula

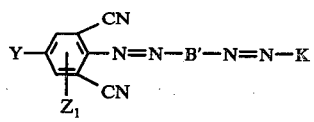 (IV)

in which Y, $Z_1$, B' and K have the same meaning as above, preferred dyestuffs of the formula (III) are those of the formula

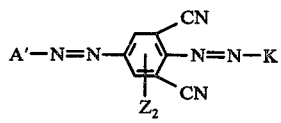 (V)

in which A', K and $Z_2$ have the same meaning as above.

The preparation of the new disazo dyestuffs of the general formula (I) is carried out according to the process described in Belgian Pat. No. 694,264 for the production of monoazo dyestuffs containing cyano groups, in which monoazo dyestuffs containing halogen substituents are reacted with metal cyanides with the exchange of halogen.

Translating this process to disazo dyestuffs, the disazo dyestuffs (I) containing cyano groups are produced by reacting disazo dyestuffs of the general formula

A—N=N—B—N=N—K  (VI)

in which A denotes an aromatic-carboxylic or aromatic-heterocyclic radical and B is an aromatic-carbocyclic radical and at least one of the radicals A and B contains at least one halogen substituent in the o-position to the azo group, preferably chlorine or bromine; K denotes the radical of a coupling component, preferably a p-hydroxy-aryl or a N-substituted p-amino-aryl radical; and the radicals A, B and K may contain further substituents, in an organic medium with metal cyanides, preferably copper(I) cyanide or with compounds forming copper(I) cyanide, the halogen being exchanged for cyanogen.

The starting dyestuffs of the formula (VI) can be used for the reaction in the form of a paste or, preferably, in the dry state. Suitable organic reaction media are, in particular, polar aprotic organic solvents, such as dimethyl sulphoxide, formamide, dimethyl formamide, dimethyl acetamide, N-methyl-pyrrolidone, pyridine, quinoline, acetonitrile, benzonitrile and phosphoric acid tris-dimethylamide. Small amounts of water do not interfere with the reaction.

Suitable metal cyanides are, inter alia, copper(I) cyanide, silver cyanide, lead cyanide, potassium hexacyanoferrate(II), calcium hexacyanoferrate(II), copper hexacyanoferrate(II) and zinc cyanide. Of these, copper(I) cyanide is of particular interest because of its excellent reactivity. It can be used as such or it can be formed in the reaction medium, for example, by adding alkali metal cyanides and suitable copper(II) salts, such as copper(II) sulphate or copper(II) acetate, to the reaction medium.

The reaction temperature may be varied within wide limits. It depends on the nature of the organic medium and, in particular, on the constitution of the starting dyestuff (VI). In general, the temperature lies between about 20° and 220° C, temperatures between 25° and 150° C being preferred.

In particular, the reaction can be carried out by dissolving or suspending the starting dyestuffs (VI) with the metal cyanide, preferably copper(I) cyanide, or with the compounds forming copper(I) cyanide, in an organic medium and, if desired, heating the mixture at an elevated temperature. The progress of the reaction can be observed by paper or thin layer chromatography. When the reaction is completed, the reaction products can be precipitated, for example, with water. Any excess of metal cyanide, such as copper(I) cyanide, or copper(I) halide can be separated from the reaction products obtained by conversion into water-soluble complex salts according to known methods, for example, with the aid of ammonia or alkali metal cyanides or by oxidising copper(I) salts to form water-soluble copper(II) salts, for example, with iron(III) chloride.

Preferred starting dyestuffs are those of the formula

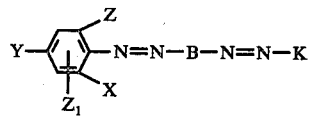 (VII)

in which X denotes a halogen atom, preferably Cl or Br, and B, K, Y, Z and $Z_1$ have the same meaning as above, and those of the formula

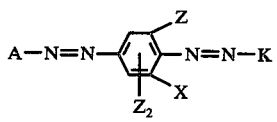 (VIII)

in which A, K, Z and $Z_2$ have the same meaning as above and X stands for a halogen atom, preferably chlorine or bromine.

If Z in the formulae (VII) and (VIII) also stands for a halogen substituent, preferably Cl or Br, it is possible, in accordance with the chosen reaction conditions and reaction components, to exchange also this substituent for a cyano group, the preferred dyestuffs of the formula (IV) or (V) being thus obtained.

The disazo dyestuffs of the formula (VI) used as starting material and, in particular, those of the formula (VII) are obtained, for example, in known manner by coupling diazo components

A — $NH_2$   (IX)

with coupling components

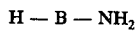

H — B — $NH_2$   (X)

diazotising the resultant aminoazo dyestuffs

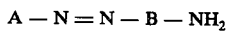

A — N=N — B — $NH_2$   (XI)

and coupling again with coupling components

K — H   (XII)

Diazo components of the formula (IX) which are suitable for preparing the aminoazo dyestuffs (XI) are, for example: 2-bromo-1-amino-naphthalene, 2-chloro-1- amino-naphthalene, 1-bromo-2-amino-naphthalene, 1-chloro-2-amino-naphthalene, 2-bromo-1-amino-anthraquinone, 2,4-dibromo-1-amino-anthraquinone and particularly those of the benzene series, such as 2-chloro-aniline, 2-bromo-aniline, 2,3-dichloro-aniline, 2,4-dichloro-aniline, 2,4-dibromo-aniline, 2,5-dichloro-aniline, 2,6-dichloro-aniline, 2,4,5-trichloro-aniline, 2,4,5-trichloro-6-bromo-aniline, 2,4,6-trichloro-aniline, 2,4,6-tribromo-aniline, 2,4-dichloro-6-bromo-aniline, 2,6-dibromo-4-chloro-aniline, 2-amino-3-chloro-toluene, 2-amino-3-bromo-toluene, 3-chloro-4-amino-toluene, 3-bromo-4-amino-toluene, 4-chloro-3-amino-toluene, 4,6-dichloro-3-amino-toluene, 3,5-dichloro-4-amino-toluene, 3,5-dibromo-4-amino-toluene, 2,4-dimethyl-6-bromo-aniline, 2,4-dimethyl-6-chloro-aniline, 3,5-dichloro-4-amino-anisole, 3,5-dibromo-4-amino-anisole, 2-bromo-4,6-dimethoxy-aniline, 2-chloro-6-nitroaniline, 2-bromo-6-nitro-aniline, 2-chloro-4-methyl-6-nitroaniline, 2-bromo-4-methyl-6-nitro-aniline, 2-amino-3-bromo-5-methyl-1-methylsulphonyl-benzene, 2-chloro-4-nitroaniline, 2-bromo-4-nitroaniline, 2,6-dichloro-4-nitroaniline, 2-bromo-6-chloro-4-nitroaniline, 2,6-dibromo-4-nitroaniline, 3,5-dibromo-4-amino-benzoic acid, 3,5-dibromo-4-amino-benzoic acid methyl ester, 3,5-dibromo-4-amino-1-cyanobenzene, 3,5-dichloro-4-amino-1-cyanobenzene, 3,5-dichloro-4-amino-1-methylsulphonylbenzene, 3,5-dibromo-4-amino-1-methylsulphonylbenzene, 3,5-dichloro-4-aminobenzene-sulphonamide, 3,5-dibromo-4-aminobenzene-sulphonamide, 3,5-dichloro-4-amino-acetophenone, 3,5-dibromo-4-amino-acetophenone, 3,5-dibromo-4-amino-benzophenone, 3,5-dibromo-4-amino-1-trifluoromethylbenzene, 2-bromo-4-cyano-aniline, 2-amino-3-bromo-5-nitro-benzoic acid methyl ester, 2-amino-3-bromo-5-nitro-1-trifluoromethylbenzene, 2-amino-3-bromo-5-nitro-1-methylsulphonyl-benzene, 2-bromo-4,6-bis-(methylsulphonyl)-aniline, 2-amino-3-bromo-5-nitro-anisole, 2-amino-3-bromo-5-nitro-toluene, 3-bromo-4-amino-5-nitrobenzaldehyde, 3-bromo-4-amino-5-nitro-1-cyanobenzene, 6-chloro-2,4-dinitroaniline, 6-bromo-2,4-dinitroaniline, 2-cyano-6-chloro-4-nitroaniline, 2-cyano-6-bromo-4-nitroaniline, 2-bromo-4,6-dicyano-aniline, 3,5-dichloro-4-amino-acetanilide, 3,5-dibromo-4-amino-acetanilide, 3,5-dichloro-4-amino-glycollic acid anilide, 3,5-dibromo-4-amino-glycollic acid anilide, 3,5-dichloro-4-amino-α-chloro-acetanilide, 3,5-dibromo-4-amino-α-chloro-acetanilide, 3,5-dichloro-4-amino-α-cyano-acetanilide, 3,5-dibromo-4-amino-α-cyano-acetanilide, 3,5-dichloro-4-amino-β-chloro-propionic acid anilide, 3,5-dibromo-4-amino-β-chloro-propionic acid anilide, 3,5-dibromo-4-amino-1-(N-ethyl-N-acetyl-amino)-benzene, 3,5-dibromo-4-amino-1-(N-cyclohexyl-N-acetyl-amino)-benzene, N-(3,5-dibromo-4-amino-phenyl)-carbamic acid methyl ester, N-(3,5-dibromo-4-amino-phenyl)-carbamic acid ethyl ester, (3,5-dibromo-4-amino-phenyl)-urea, N,N-dimethyl-N'-(3,5-dibromo-4-amino-phenyl)urea, 3,5-dibromo-4-amino-1-(N-ethyl-N-methylsulphonyl-amino)-benzene, 3,5-dichloro-4-amino-1-(N-benzoyl-amino)-benzene, 3,5-dibromo-4-amino-1-(N-benzoyl-amino)-benzene, 3,5-dibromo-4-amino-1-(N-ethyl-N-benzoyl-amino)-benzene, 3,5-dibromo-4-amino-1-(N-4'-nitrobenzoyl-amino)-benzene, N-(3,5-dibromo-4-amino-phenyl)-succinimide, N-(3,5-dibromo-4-amino-phenyl)-maleic acid imide, N-(3,5-dibromo-4-amino-phenyl)-phthalimide, as well as 1-amino-benzene, 1-methyl-4-aminobenzene, 1-methyl-3-aminobenzene, 1-methyl-2-amino-benzene, 1-amino-2-methoxy-benzene, 1-amino-3-methoxy-benzene, 1-amino-4-methoxy-benzene, 1-amino-2-ethoxy-benzene, 1-amino-3-ethoxy-benzene, 1-amino-4-ethoxy-benzene, 1-chloro-3-amino-benzene, 1-chloro-4-amino-benzene, 1-nitro-2-amino-benzene, 1-nitro-3-amino-benzene, 1-nitro-4-amino-benzene, 2-amino-benzo-nitrile, 3-amino-benzonitrile, 4-amino-benzonitrile, 2-aminobenzoic acid methyl ester, 4-amino-benzoic acid methyl ester, 3-amino-trifluoromethyl-benzene, 4-amino-trifluoromethyl-benzene, 3-amino-benzaldehyde, 4-amino-benzaldeyde, (3-amino-phenyl)-methylsulphone, (4-amino-phenyl)-ethylsulphone, 3-aminobenzene-sulphonic acid amide, 4-aminobenzene-sulphonic acid amide, 4-amino-benzene-sulphonic acid-N,N-dimethylamide, 1-amino-4-acetylaminobenzene, 1-amino-4-benzolyl-amino-benzene, 4-amino-phenoxy acetic acid methyl ester, 3-amino-phenoxy acetic acid ethyl ester, 6-amino-1,3-benzodioxan, 3-amino-1,2,4-triazole, 2-amino-thiazole, 2-amino-4-methyl-thiazole-carboxylic acid-(5) ethyl ester, 2-amino-pyridine-1-oxide, and 3-aminopyridine.

Suitable coupling components of the formula (X) are, for example: 1-amino-benzene, 1-methyl-2-amino-benzene, 1-methyl-3-amino-benzene, 1-amino-2-methoxy-benzene, 1-amino-3-methoxy-benzene, 1-amino-2-ethoxy-benzene, 1-amino-3-ethoxy-benzene, 1-methyl-2-amino-4-methoxy-benzene, 1-methyl-3-amino-4-methoxy-benzene, 1-methyl-2-amino-4-ethoxy-benzene, 1-methyl-3-amino-4-ethoxy-benzene, 1,4-dimethyl-2-amino-benzene, 1-methyl-4-chloro-2-amino-benzene, 3-chloro-aniline, 1-amino-2,5-dimethoxy-benzene, 1-amino-2,5-diethoxy-benzene, 1-amino-3-acetamino-benzene, 1-amino-2-methoxy-5-acetamino-benzene, 1-amino-2-ethoxy-5-acetamino-benzene, 1-methyl-2-amino-4-acetamino-benzene and 1-amino-naphthalene.

In order to prevent the formation of diazoamino compounds, it is expedient in many cases to replace the coupling component (X) mentioned above with their N-sulphonic acid or N-methane-sulphonic acid derivatives, and to split off the protective groups by acidic or alkaline hydrolysis when the coupling giving the aminoazo dyestuffs (XI) is completed.

From the large number of coupling components H—K which are suitable for synthetising the disazo dyestuffs of the formula (VI), the following compounds are mentioned by way of example: 1-hydroxy-benzene, 1-hydroxy-2-methylbenzene, 1-hydroxy-3-methyl-benzene, 1-hydroxy-4-methylbenzene, 1-hydroxynaphthalene, 1-hydroxy-4-methyl-naphthalene, 1-hydroxy-4-methoxy-naphthalene, 2-hydroxy-naphthalene, 2-hydroxy-8-acetamido-naphthalene, 2-hydroxynaphthalene-3-carboxylic acid amide, 2-hydroxynaphthalene-3-carboxylic acid anilide, 2-hydroxynaphthalene-3-carboxylic acid ethyl ester, 1-hydroxynaphthalene-4-sulphonamide, 2-hydroxynaphthalene-5-N-methylsulphonamide, 2-hydroxynaphthalene-6-N,N-dimethylsulphonamide, 1-aminonaphthalene, 1-diethylamino-naphthalene, 1-hydroxyethylamino-naphthalene, 2-amino-naphthalene, 2-aminonaphthalene-5-sulphonamide, 2-aminonaphthalene-5-N-methylsulphonamide, 2-aminonaphthalene-6-sulphonamide, acetoacetic acid anilide, 3-methyl-pyrazolone-(5), 1-hydroxyethyl-3-methyl-pyrazolone-(5), 1-cyanoethyl-3-methyl-pyrazolone-(5), 1-(3'-thia-cyclopentyl-3',3'-dioxide)-3-methyl-pyrazolone-(5), 1-phenyl-3-methyl-pyrazolone-(5), 1-phenyl-pyrazolone-(5)-carboxylic acid-(3) ethyl ester, 1,2-diphenyl-pyrazolidinedione-(3,5), 1-isopropyl-3-methyl-5-amino-pyrazolone, 1-phenyl-3-methyl-5-aminopyrazole, 1-phenyl-3-methoxy-5-amino-pyrazole, indole, 2-methyl-indole, 2-phenyl-indole, 1-methyl-2-phenyl-indole, 2-amino-4-phenyl-thiazole, 2-methylamino-4-phenyl-thiazole, 8-hydroxy-quinoline, 2,4-dihydroxy-quinoline, 1-methyl-2,4-dihydroxy-quinoline, 1,2,3,4-tetrahydroquinoline, N-hydroxyethyl-1,2,3,4-tetrahydroquinoline, N-butyl-3-hydroxy-7-methyl-1,2,3,4-tetrahydroquinoline, 3,6'-dihydroxy-1,2,3,4-tetrahydro-benzo-(1',2' : 7,8)-quinoline, imidazole, 4,5-dimethyl-imidazole and 4,5-diphenyl-imidazole. Particularly suitable compounds are aminobenzene derivatives of the general formula

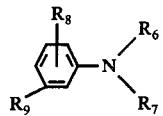

in which $R_6$ and $R_7$ stand for hydrogen; an alkyl group which may be substituted by halogen, especially chlorine and bromine, by cyano, hydroxyl, acyl, acyloxy, alkoxy, alkoxycarbonyl, alkoxy-carbonyloxy, alkylsulphonyl, arylsulphonyl radicals, by primary, secondary or tertiary amino groups, quaternary ammonium groups or acylamino radicals; or for an aralkyl group or an optionally substituted aryl group; $R_8$ denotes hydrogen or a substituent, particularly an alkyl group with 1–2 carbon atoms, an alkoxy group with 1–2 carbon atoms, a hydroxyalkoxy, acyloxy-alkoxy or aryloxy group; and $R_9$ stands for hydrogen, an optionally substituted alkyl group with 1–2 carbon atoms, an alkoxy group with 1–2 carbon atoms, a cyano, sulphone, sulphonamide group, a primary, secondary or tertiary amino group or, in particular, an acylamino group, as well as for an optionally substituted urea group or for halogen, such as chlorine or bromine.

The acylamino groups comprise, in particular, formylamino, alkylcarbonylamino, arylcarbonylamino, alkylsulphonylamino, arylsulphonylamino and alkoxycarbonylamino groups. Suitable acylamino groups are, for example, acetylamino, hydroxyacetylamino, acyloxyacetylamino, chloroacetylamino, propionylamino, chloropropionylamino, succinylimido or phthalimido groups.

Suitable quaternary ammonium groups are, for example, trimethylammonium, triethylammonium, N,N-dimethylhydrazinium, pyridinium or triazolium groups.

The compounds assembled in the following Table are given by way of example:

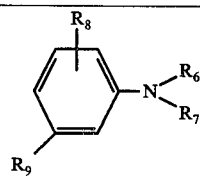

| $R_6$ | $R_7$ | $R_8$ | $R_9$ |
|---|---|---|---|
| H | H | o-CH$_3$ | H |
| H | H | m-CH$_3$ | H |
| H | H | o-OCH$_3$ | CH$_3$ |
| H | H | o-OCH$_3$ | OCH$_3$ |
| C$_2$H$_5$ | H | H | H |
| C$_2$H$_5$ | C$_2$H$_5$ | H | H |
| CH$_2$CH$_2$OH | H | m-CH$_3$ | H |
| CH$_2$CH$_2$OH | CH$_2$CH$_2$OH | H | H |
| CH$_2$CH$_2$CN | CH$_2$CH$_2$CN | H | H |
| CH$_2$CH$_2$OCOCH$_3$ | CH$_2$CH$_2$OCOCH$_3$ | H | H |
| CH$_3$ | CH$_3$ | H | CH$_3$ |
| CH$_2$CH$_2$OCH$_3$ | CH$_2$CH$_2$OCH$_3$ | H | H |
| CH$_2$CH$_2$CN | C$_2$H$_5$ | H | H |
| CH$_2$CH$_2$CN | CH$_2$CH$_2$OH | H | H |
| C$_2$H$_5$ | CH$_2$CH$_2$OCOCH$_3$ | H | H |
| C$_2$H$_5$ | CH$_2$CH$_2$OCOCH$_3$ | m-CH$_3$ | H |
| C$_2$H$_5$ | CH$_2$CH$_2$OCOCH$_3$ | o-CH$_3$ | H |
| C$_2$H$_5$ | C$_2$H$_5$ | o-OCH$_3$ | OCH$_3$ |
| C$_2$H$_5$ | C$_2$H$_5$ | o-OCH$_3$ | CH$_3$ |
| CH$_3$ | C$_6$H$_5$ | H | H |
| C$_2$H$_5$ | C$_2$H$_5$ | H | NHCOCH$_3$ |
| CH$_3$ | CH$_3$ | H | OC$_2$H$_5$ |
| H | H | o-OCH$_3$ | OCH$_3$ |
| CH$_3$ | CH$_2$CH$_2$OCOCH$_3$ | H | H |
| H | CH$_2$CH$_2$OCOCH$_3$ | H | H |
| CH$_2$CH$_2$OH | CH$_2$CH$_2$OCOCH$_3$ | H | H |
| CH$_2$CH$_2$OCOCH$_3$ | CH$_2$CH$_2$OCOCH$_3$ | H | CH$_3$ |
| CH$_2$CH$_2$OCOCH$_3$ | CH$_2$CH$_2$OCOCH$_3$ | OCH$_3$ | CH$_3$ |
| CH$_2$CH$_2$N(CH$_3$)$_2$ | H | H | H |
| CH$_2$CH$_2$N(CH$_3$)$_2$ | H | m-CH$_3$ | H |
| CH$_2$CH$_2$N(C$_2$H$_5$)$_2$ | H | m-CH$_3$ | H |
| CH$_2$CH$_2$N(CH$_3$)$_2$ | C$_2$H$_5$ | m-CH$_3$ | H |
| CH$_2$CH$_2$N(CH$_3$)$_2$ | C$_4$H$_9$ | H | H |
| CH$_2$CH$_2$N(CH$_3$)$_2$ | CH$_2$CH$_2$OH | H | H |
| CH$_2$CH$_2$N(CH$_3$)$_2$ | C$_2$H$_5$ | o-OCH$_3$ | CH$_3$ |
| CH$_2$CH$_2$N(CH$_3$)$_2$ | C$_2$H$_5$ | o-OCH$_3$ | OCH$_3$ |
| CH$_2$CH$_2$CN | CH$_2$CH$_2$CN | m-CH$_3$ | H |
| CH$_2$CH$_2$CN | CH$_2$CH$_2$CN | o-OCH$_3$ | CH$_3$ |
| CH$_3$ | CH$_3$ | m-Cl | H |
| C$_2$H$_5$ | CH$_2$CH$_2$Cl | m-CH$_3$ | H |
| C$_2$H$_5$ | CH$_2$CH$_2$OH | H | H |
| C$_4$H$_9$ | CH$_2$CH$_2$OH | H | H |
| C$_2$H$_5$ | CH$_2$CH$_2$OH | H | CH$_3$ |
| C$_4$H$_9$ | CH$_2$CH$_2$OCOCH$_3$ | H | CH$_3$ |
| C$_4$H$_9$ | CH$_2$CH$_2$Cl | H | H |
| C$_2$H$_5$ | CH$_2$CH$_2$COOCH$_3$ | H | H |
| C$_2$H$_5$ | CH$_2$CH$_2$COOCH$_3$ | H | CH$_3$ |
| C$_4$H$_9$ | CH$_2$CH$_2$CN | H | H |

-continued

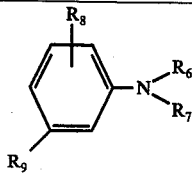

| $R_6$ | $R_7$ | $R_8$ | $R_9$ |
|---|---|---|---|
| $C_4H_9$ | $CH_2CH_2CN$ | H | $CH_3$ |
| $CH_2CH_2OCOOCH_3$ | $CH_2CH_2OCOOCH_3$ | H | H |
| $CH_2CH_2OCOOCH_3$ | $CH_2CH_2OCOOCH_3$ | H | $CH_3$ |
| $CH_2CH_2OCOCH_3$ | $CH_2CH_2CN$ | H | H |
| $CH_2CH_2OCOCH_3$ | $CH_2CH_2CN$ | H | $CH_3$ |
| $CH_2CH_2OH$ | $CH_2CH_2OH$ | H | $OCH_3$ |
| $CH_2CH_2OH$ | $CH_2CH_2OH$ | H | $OC_2H_5$ |
| $CH_2CH_2OCOCH_3$ | $CH_2CH_2OCOCH_3$ | H | $OCH_3$ |
| $CH_2CH_2OCOOCH_3$ | $CH_2CH_2OCOOCH_3$ | H | $OCH_3$ |
| $C_2H_5$ | $\overset{\oplus}{C}H_2CH_2N(CH_3)_3$ | H | H |
| $C_2H_5$ | $\overset{\oplus}{C}H_2CH_2N(CH_3)_3$ | H | $CH_3$ |
| $C_2H_5$ | $CH_2CH_2\overset{\oplus}{N}\!\!\diagdown\!\!\diagup$ (pyridinium) | H | $CH_3$ |
| $C_2H_5$ | $\overset{\oplus}{C}H_2CH_2N(CH_3)_2\!-\!NH_2$ | H | H |
| $C_2H_5$ | $\overset{\oplus}{C}H_2CH_2N(CH_3)_2\!-\!NH_2$ | H | $CH_3$ |
| $CH_3$ | $CH_3$ | H | NHCHO |
| $CH_3$ | $CH_3$ | H | $NHCOCH_3$ |
| $CH_3$ | $CH_3$ | H | $NHCOOC_2H_5$ |
| $CH_3$ | $CH_3$ | H | $NHCOC_2H_5$ |
| $CH_3$ | $CH_3$ | H | $NHCOCH_2Cl$ |
| $CH_3$ | $CH_3$ | H | $NHCOCH_2OH$ |
| $CH_3$ | $CH_3$ | H | $NHCONH_2$ |
| $C_2H_5$ | $C_2H_5$ | H | NHCHO |
| $C_2H_5$ | $C_2H_5$ | H | $NHCOC_2H_5$ |
| $C_2H_5$ | $C_2H_5$ | H | $NHCOOC_2H_5$ |
| $C_2H_5$ | $C_2H_5$ | H | $NHCOCH_2OH$ |
| $C_2H_5$ | $C_2H_5$ | H | $NHCOCH_2Cl$ |
| $C_2H_5$ | $C_2H_5$ | H | $NHCOCH_2OCOCH_3$ |
| $C_2H_5$ | $C_2H_5$ | H | $NHCOCH_2CH_2Cl$ |
| $C_2H_5$ | $C_2H_5$ | H | $NHCOCH_2CH_2Cl$ |
| $CH_3$ | $CH_3$ | H | $NHCOCH_2\overset{\oplus}{N}(CH_3)_3$ |
| $C_2H_5$ | $C_2H_5$ | H | $NHCOCH_2\overset{\oplus}{N}(CH_3)_3$ |
| $C_2H_5$ | $C_2H_5$ | H | $NHCONH_2$ |
| $C_4H_9$ | $C_4H_9$ | H | $NHCOCH_3$ |
| $CH_2CH_2OH$ | $CH_2CH_2OH$ | H | $NHCOCH_3$ |
| $CH_2CH_2OCOCH_3$ | $CH_2CH_2OCOCH_3$ | H | $NHCOCH_3$ |
| $CH_2CH_2OCOOCH_3$ | $CH_2CH_2OCOOCH_3$ | H | $NHCOCH_3$ |
| $C_2H_5$ | $CH_2CH_2COOCH_3$ | H | $NHCOCH_3$ |
| $C_3H_7$ | $CH_2CH_2COOC_2H_5$ | H | $NHCOCH_3$ |
| $C_4H_9$ | $CH_2CH_2COOCH_3$ | H | $NHCOCH_3$ |
| $CH_2CH_2OH$ | $CH_2CH_2COOCH_3$ | H | $NHCOCH_3$ |
| $CH_2CH_2OCOCH_3$ | $CH_2CH_2COOCH_3$ | H | $NHCOCH_3$ |
| $CH_2CH_2OH$ | $CH_2CH_2CN$ | H | $NHCOCH_3$ |
| $CH_2CH_2OCOCH_3$ | $CH_2CH_2CN$ | H | $NHCOCH_3$ |
| $C_2H_5$ | $\overset{\oplus}{C}H_2CH_2N(CH_3)_3$ | H | $NHCOCH_3$ |
| $CH_2CH_2OCOCH_3$ | $CH_2CH_2OCOCH_3$ | $o\text{-}OCH_3$ | $NHCOCH_3$ |
| $CH_2CH_2OCOCH_3$ | $CH_2CH_2OCOCH_3$ | $o\text{-}OCH_2CH_2OCOCH_3$ | $NHCOCH_3$ |
| $CH_2CH_2OH$ | $CH_2CH_2CN$ | $o\text{-}OCH_3$ | $NHCOCH_3$ |
| $CH_2CH_2OCOOCH_3$ | $CH_2CH_2OCOOCH_3$ | $o\text{-}OCH_3$ | $NHCOCH_3$ |
| $C_2H_5$ | $C_2H_5$ | $o\text{-}C_2H_5$ | $NHCOCH_3$ |
| $CH_2CH_2COOC_2H_5$ | $CH_2CH_2COOC_2H_5$ | H | $CH_3$ |
| $CH_2CH_2OCOCH_3$ | $CH_2CH_2OCOCH_3$ | $o\text{-}OC_2H_5$ | $NHCOCH_3$ |
| $CH_2CH_2CN$ | H | H | $NHCOCH_3$ |
| $CH_2CH_2OCOCH_3$ | $CH_2CH_2OCOCH_3$ | H | $NHSO_2CH_3$ |
| $CH_2CH_2CN$ | $CH_2CH_2CN$ | H | $NHCOOC_2H_5$ |
| $CH_2CH_2CN$ | $CH_2CH_2COOCH_3$ | H | $NHCOCH_3$ |
| $CH_2CH_2COOCH_3$ | $CH_2CH_2COOCH_3$ | H | $NHCOCH_3$ |
| $CH_2CH_2OCOOCH_3$ | H | H | $NHCOCH_3$ |

Also when coupling these coupling components, it may be expedient to replace the coupling components containing free amino groups with those containing the corresponding N-sulphonic acids or N-methane-sulphonic acids and to split off the protective groups by hydrolysis when the coupling is completed.

Disazo dyestuffs of the formula (VIII) are obtained, for example, by halogenating, preferably chlorinating or brominating, 4-aminophenyl-azo dyestuffs of the formula

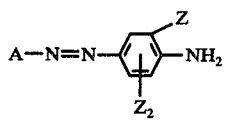
(XIII)

in which A, Z and $Z_2$ have the same meaning as above, in the o-position to the amino group (if Z stands for hydrogen, a halogenation can take place also in this position), diazoising the resultant 3-halo- or 3,5-dihalo-4-aminophenyl-azo dyestuffs of the formula

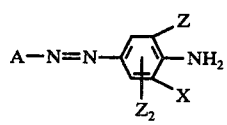
(XIV)

in which A, X, Z and $Z_2$ have the same meaning as above,
and coupling with suitable coupling components K—H.

The halogenation of the 4-aminophenyl-azo dyestuffs of the formula (XIII) to form the halo- or dihalo-aminophenyl-azo dyestuffs of the formula (XIV) is carried out in known manner, preferably in an organic medium, for example, in alcohols, such as methanol or in aliphatic carboxylic acids, such as acetic acid, or in mixtures of these solvents, optionally in the presence of an acid-binding agent, e.g. sodium acetate, with elementary halogen, preferably chlorine or bromine, preferably at temperatures between 0° and 100° C.

For the monohalogenation of dyestuffs of the formula

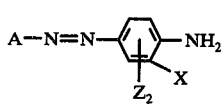
(XV)

to form the dyestuffs

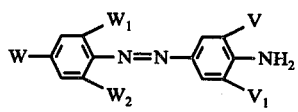
(XVI)

in which A, X and $Z_2$ have the same meaning as above, it may be advantageous to acylate the aminoazo dyestuff (XV) prior to halogenation, in order to reduce the activating influence of the amino group, and to split off the acyl group when the halogenation is completed.

From the large number of aminoazo dyestuffs of the formula (XIV) which are suitable for preparing the disazo dyestuffs of the formula (III), there may be mentioned those of the formula

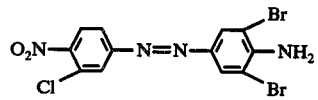
(XVII)

in which W, $W_1$, $W_2$, V and $V_1$ have the meaning given in Table:

Table

| Dyestuffs of the formula (XVII) | | | | |
|---|---|---|---|---|
| W | $W_1$ | $W_2$ | V | $V_1$ |
| H | H | H | Cl | H |
| H | H | H | Br | H |
| H | H | H | Cl | $CH_3$ |
| H | H | H | Cl | $OCH_3$ |
| H | H | H | Br | $CH_3$ |
| H | H | H | Br | $OCH_3$ |
| H | $CH_3$ | H | Br | $CH_3$ |
| Cl | H | H | Cl | H |
| Cl | H | H | Br | H |
| Cl | H | H | Br | $CH_3$ |
| Cl | H | H | Br | $OCH_3$ |
| $O_2N$ | H | H | Br | H |
| $O_2N$ | H | H | Br | $CH_3$ |
| $O_2N$ | H | H | Br | $OCH_3$ |
| $O_2N$ | H | Cl | Br | H |
| $O_2N$ | H | Cl | Br | $CH_3$ |
| $O_2N$ | H | Cl | Br | $OCH_3$ |
| $O_2N$ | H | Br | Br | $CH_3$ |
| $O_2N$ | Br | Br | Br | $OCH_3$ |
| Br | Br | Br | Br | $CH_3$ |
| H | H | H | Cl | Cl |
| Cl | H | H | Cl | Cl |
| $CH_3$ | H | H | Cl | Cl |
| $O_2N$ | H | H | Cl | Cl |
| $O_2N$ | H | Cl | Cl | Cl |
| H | H | H | Cl | Br |
| Cl | H | H | Cl | Br |
| $O_2N$ | H | H | Cl | Br |
| $CH_3$ | H | H | Cl | Br |
| $O_2N$ | H | Cl | Cl | Br |
| $O_2N$ | Br | Br | Cl | Br |
| $CH_3$ | Br | Br | Cl | Br |
| H | H | H | Br | Br |
| $CH_3$ | H | H | Br | Br |
| $CH_3O$ | H | H | Br | Br |
| Cl | H | H | Br | Br |
| Br | H | H | Br | Br |
| $CH_3SO_2$ | H | H | Br | Br |
| $O_2N$ | H | H | Br | Br |
| $O_2N$ | H | $OCH_3$ | Br | Br |
| $O_2N$ | H | Cl | Br | Br |
| $O_2N$ | Br | Br | Br | Br |
| H | H | $COOCH_3$ | Br | Br | as well as the following:

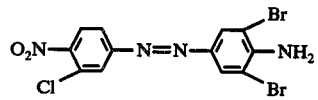

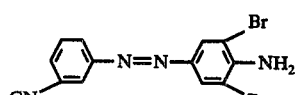

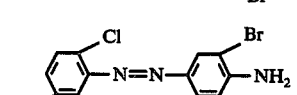

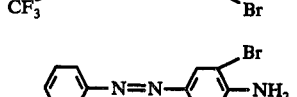

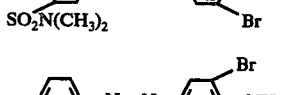

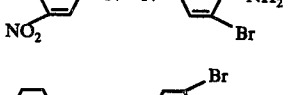

-continued

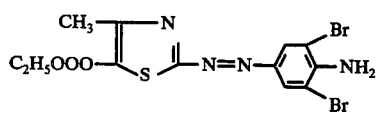

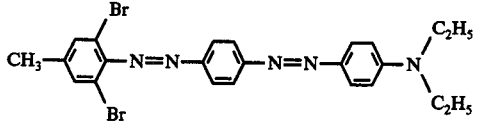

The dyestuffs of the general formula (I) are suitable for dyeing hydrophobic fibre materials, especially those of aromatic polyesters, for example, polyethylene terephthalates and polyesters from terephthalic acid and 1,4-bis-hydroxymethyl-cyclohexane, cellulose triacetate, synthetic superpolyamides and -polyurethanes, polymers or copolymers of acrylonitrile and polyolefines

EXAMPLE 1

10.7g 4′-amino-4-methyl-2,6-dibromo-azobenzene are diazotised in a mixture of 50 ml glacial acetic acid and 25 ml propionic acid at 0°–5° C with 5 ml of 41.2% nitrosyl-sulphuric acid. 4.8 g, N,N-diethyl-aniline are dissolved in ice-water with the addition of 7 ml of 48% sulphuric acid, and after the addition of 1 g amidosulphonic acid, the diazotised mixture is added at 0°–5° C while ice is thrown in. A pH value of 4–5 is adjusted by the dropwise addition of a sodium acetate solution, and when the coupling is completed, the dyestuff is filtered off with suction, washed with water and dried.

7.7 g of the resultant dyestuff of the formula are heated in 75 ml dimethyl formamide with 3.2 g copper(I) cyanide at 60°–70° C for 3 hours. After cooling, the dyestuff formed is precipitated with water, and the copper(I) salts precipitated at the same time are caused to dissolve with complex formation by the addition of 1o g potassium cyanide.

The dyestuff obtained presumably corresponds to the following formula

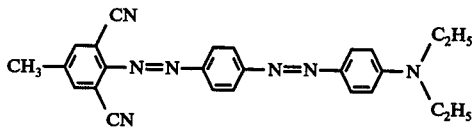

in the dry form, it is a dark powder which dyes superpolyamide fibres from an aqueous dispersion in Bordeaux shades.

The 4′-amino-4-methyl-2,6-dibromo-azobenzene used in the present Example can be obtained in the usual way by coupling anilino-methane-sulphonic acid with diazotised 3,5-dibromo-4-amino-1-methyl-benzene and subsequent elimination of the protective groups by heating with a dilute sodium hydroxide solution.

In a completely analogous manner, there are obtained, from the dyestuffs (I) of the following Table, the dyestuffs (II) which exhibit the specified shades in a dimethyl formamide solution.

Table

| I | II | Colour of solution of II in dimethyl formamide |
|---|---|---|
| | | red-violet |
| | | red-violet |
| | | violet |
| | | violet |
| | | blue |

EXAMPLE 2

8.8 g 4'-amino-2,3'-dimethyl-5'-bromo-azobenzene are diazotised in 50 ml glacial acetic acid and 25 ml propionic acid at 0°–5° C with 5 ml of 41.2% nitrosyl-sulphuric acid and coupled in the usual manner with 7.4 g 3-(N,N-diethylamino)-acetanilide.

9.5 g of the dyestuff thus prepared and corresponding to the formula

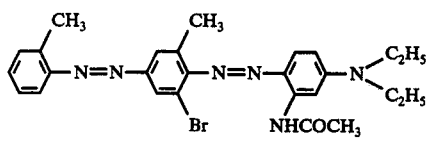

are heated in 50 ml N-methyl-pyrrolidone with 4 g copper(I) cyanide at 40°–50° C for 2 hours. The colour of the solution changes from red to violet. The reaction product is precipitated with water and the likewise precipitated copper(I) salts are removed by the addition of an aqueous solution of 15 g potassium cyanide. After drying, the remaining dyestuff is a dark powder which dyes superpolyamide fibres from an aqueous dispersion in bluish violet shades of very good fastness to wet processing and good fastness to light. The dyestuff presumably corresponds to the following formula

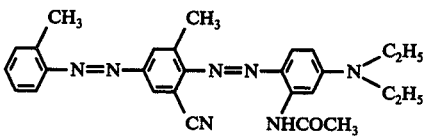

The 4'-amino-2,3'-dimethyl-5'-bromo-azobenzene used in the present Example can be obtained in the following way:

114 g 4'-amino-2,3'-dimethyl-azobenzene are stirred in 500 methanol and mixed dropwise with 27 ml bromine at 25°–30° C while externally cooling with water. After stirring over night, the precipitate is filtered off with suction and washed with water until neutral. The resultant crude product of melting point 100°–103° C can be purified by recrystallisation from isopropanol; melting point 111°–113° C.

Elementary analysis gave the following values: $C_{14}H_{14}BrN_3$ (304): Calc.: C: 55.3; H: 4.6; N: 13.8; Br: 26.3. Found: C: 55.3; H: 4.6; N: 13.5; Br: 26.1.

In a completely analogous manner there are obtained, from the disazo dyestuffs assembled in the following Table under (I), the products of column (II); the colour of their solution in dimethyl formamide is stated.

Table

| I | III | Colour of solution of III in dimethyl formamide |
|---|---|---|
| (structure) | (structure) | bluish red |
| (structure) | (structure) | bluish red |
| (structure) | (structure) | red-violet |
| (structure) | (structure) | violet |
| (structure) | (structure) | blue |

EXAMPLE 3

9 g 3-chloro-5-bromo-4-amino-azobenzene are diazotised in glacial acetic acid/propionic acid with nitrosylsulphuric acid and coupled in the usual manner with 7.4 g 3-(N,N-diethylamino)-acetanilide. 11.5 g of the resultant dyestuff of the formula

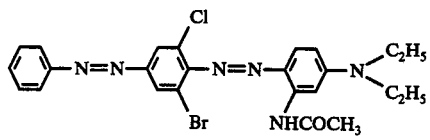

are heated in 75 ml dimethyl sulphoxide with 2.5 g copper(I) cyanide at 40°–50° C for 2 hours while stirring. After cooling, the reaction product is precipitated with water and freed from copper(I) salts by treatment with an aqueous solution of 11 g potassium cyanide.

The product obtained presumably corresponds to the following formula

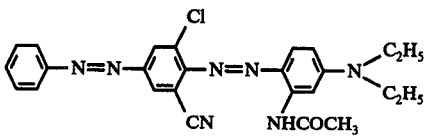

When dried, it is a dark powder which dyes textile materials of superpolyamide, polyethylene terephthalate or cellulose triacetate in reddish blue shades.

The 3-chloro-5-bromo-4-amino-azobenzene used in the present Example was obtained by bromination of 3-chloro-4-amino-azobenzene in methanol at 20°–25° C; melting point 152°–153° C.

$C_{12}H_9BrClN_3$ (310.5): Calc.; Cl = 11.4; Br = 25.8. Found: cl = 11.2; Br = 25.9.

In a completely analogous manner, the dyestuffs (II) are obtained from the dyestuffs (I) of the following Table.

Table

| I | II | Colour of solution of II in dimethyl formamide |
|---|---|---|
| (structure: phenyl-N=N-[Cl,Br-phenyl-CN]-N=N-C6H4-N(C2H5)(CH2CH2OCOCH3)) | (structure: phenyl-N=N-[Cl-phenyl-CN]-N=N-C6H4-N(C2H5)(CH2CH2OCOCH3)) | bluish red |
| (structure with C4H9, CH3, Br, Cl) | (structure with C4H9, CH3, Cl, CN) | red-violet |
| (structure with C2H5, CH2CH2OCOCH3, NHCOCH3, Br, Cl) | (structure with C2H5, CH2CH2COOCH3, NHCOCH3, Cl, CN) | blue |
| (structure with 2,6-Cl, phenyl-N=N, NHCOCH2OCOCH3, N(C2H5)2) | (structure with 2,6-Cl, CN, phenyl-N=N, NHCOCH2OCOCH3, N(C2H5)2) | blue |

Table

| I | II | Colour of solution of II in dimethyl formamide |
|---|---|---|
| Br-substituted diazo coupled to 4-hydroxyphenyl | CN-substituted diazo coupled to 4-hydroxyphenyl | brown |
| Br-substituted diazo coupled to 4-[N(C$_4$H$_9$)(CH$_2$CH$_2$OCOCH$_3$)]phenyl | CN-substituted diazo coupled to 4-[N(C$_4$H$_9$)(CH$_2$CH$_2$OCOCH$_3$)]phenyl | red-violet |
| Br-substituted diazo coupled to 4-[N(C$_2$H$_5$)(CH$_2$CH$_2$COOCH$_3$)]-3-methylphenyl | CN-substituted diazo coupled to 4-[N(C$_2$H$_5$)(CH$_2$CH$_2$COOCH$_3$)]-3-methylphenyl | violet |
| Br-substituted diazo coupled to 4-[N(CH$_2$CH$_2$OCOCH$_3$)$_2$]-3-methylphenyl | CN-substituted diazo coupled to 4-[N(CH$_2$CH$_2$OCOCH$_3$)$_2$]-3-methylphenyl | red-violet |
| Br-substituted diazo coupled to 4-[N(CH$_2$CH$_2$OCOCH$_3$)$_2$]-3-NHCOCH$_3$-phenyl | CN-substituted diazo coupled to 4-[N(CH$_2$CH$_2$OCOCH$_3$)$_2$]-3-NHCOCH$_3$-phenyl | violet |
| Br-substituted diazo coupled to 4-[N(C$_2$H$_5$)(CH$_2$CH$_2$OCOCH$_3$)]-3-NHCOCH$_3$-phenyl | CN-substituted diazo coupled to 4-[N(C$_2$H$_5$)(CH$_2$CH$_2$OCOCH$_3$)]-3-NHCOCH$_3$-phenyl | blue |
| Br-substituted diazo coupled to 4-[N(OC$_2$H$_5$,CH$_2$CH$_2$OCOCH$_3$)(CH$_2$CH$_2$OCOCH$_3$)]-3-NHCOCH$_3$-phenyl | CN-substituted diazo coupled to 4-[N(OC$_2$H$_5$,CH$_2$CH$_2$OCOCH$_3$)(CH$_2$CH$_2$OCOCH$_3$)]-3-NHCOCH$_3$-phenyl | greenish blue |

EXAMPLE 4

If the 9 g 3-chloro-5-bromo-4-amino-azobenzene are replaced in Example 3 with 10.4 g 3,5-dibromo-4-amino-azobenzene which are analogously diazotised and coupled with 7.4 g 3(N,N-diethylamino)-acetanilide, then a dyestuff of the formula

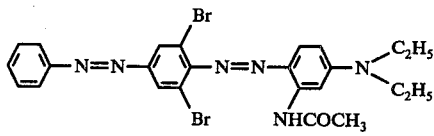

results. The reaction of 10.4 g of this dyestuff with 4.2 g copper(I) cyanide in 75 ml dimethyl formamide at 40°–50° C yields a product of the formula

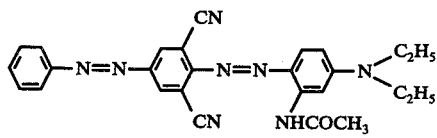

which dyes polyester fibres from an aqueous suspension in blue shades of good fastness properties.

In a completely analogous manner, there are obtained, from the dyestuffs (I) of the following Table, the dyestuffs (II) which also yield dyeings of good fastness properties on polyester fibres.

EXAMPLE 5

11.6 g 4-nitro-4'-amino-3',5'-dibromo-azobenzene are diazotised in a mixture of 100 ml glacial acetic acid and 50ml propionic acid at about 10° C with 5 ml of 41.2% nitrosyl-sulphuric aci and coupled in analogy with Example 1 with 4.8 g N,N-diethylaniline. After drying, the dyestuff of the formula

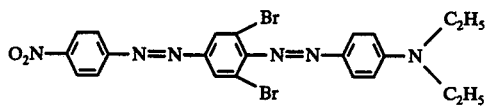

is obtained in the form of a brown powder.

10.6 g of this dyestuff are heated with the addition of 4.7 g copper(I) cyanide and 4 g pyridine in 100 ml nitrobenzene at 110°-120° C for 5 hours while stirring. The solvent is then distilled off with steam and the remaining dyestuff is freed from copper(I) salts by treatment with an aqueous solution of 15 potassium cyanide. The dyestuff obtained in this way presumably corresponds to the following formula

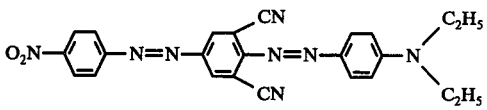

In the dry form it is a black powder which dyes polyester fibres from an aqueous dispersion in blue shades.

The 4-nitro-4'-amino-3',5'-dibromo-azobenzene used in the present Example as starting material was prepared in bromination of 4-nitro-4'-amino-azobenzene in methanol at 25°-30° C. It can be obtained in the pure form (melting point 236°-237° C) by recrystallisation from dimethyl formamide/isopropanol (1:1).

$C_{12}H_8Br_2N_4O_2$ (400): Calc.: C = 36.0; H = 2.0; O = 8.0; N = 14.0; Br = 40.0. Found: C = 35.9; H = 2.0; O = 8.4; N = 13.7; Br = 40.0.

In a completely analogous manner, there can be obtained, from the dyestuffs (I) of the following Table, the dyestuffs (II) which also yield dyeings of good fastness properties on polyester fibres.

Table

| I | II | Colour of solution of II in dimethyl formamide |
|---|---|---|
| $O_2N\text{-}C_6H_4\text{-}N=N\text{-}C_6H_2(Br)_2\text{-}N=N\text{-}C_6H_3(CH_3)\text{-}N(C_2H_5)(CH_2CH_2COOCH_3)$ | $O_2N\text{-}C_6H_4\text{-}N=N\text{-}C_6H_2(CN)_2\text{-}N=N\text{-}C_6H_3(CH_3)\text{-}N(C_2H_5)(CH_2CH_2COOCH_3)$ | blue |
| $O_2N\text{-}C_6H_4\text{-}N=N\text{-}C_6H_2(Br)_2\text{-}N=N\text{-}C_6H_3(NHCOCH_3)\text{-}N(C_2H_5)_2$ | $O_2N\text{-}C_6H_4\text{-}N=N\text{-}C_6H_2(CN)_2\text{-}N=N\text{-}C_6H_3(NHCOCH_3)\text{-}N(C_2H_5)_2$ | greenish blue |
| $O_2N\text{-}C_6H_4\text{-}N=N\text{-}C_6H_2(Br)_2\text{-}N=N\text{-}C_6H_3(NHCOCH_3)\text{-}N(C_2H_5)(CH_2CH_2COOCH_3)$ | $O_2N\text{-}C_6H_4\text{-}N=N\text{-}C_6H_2(CN)_2\text{-}N=N\text{-}C_6H_3(NHCOCH_3)\text{-}N(C_2H_5)(CH_2CH_2COOCH_3)$ | greenish blue |
| $O_2N\text{-}C_6H_4\text{-}N=N\text{-}C_6H_2(Br)_2\text{-}N=N\text{-}C_6H_3(NHCOCH_2OCOCH_3)\text{-}N(C_2H_5)_2$ | $O_2N\text{-}C_6H_4\text{-}N=N\text{-}C_6H_2(CN)_2\text{-}N=N\text{-}C_6H_3(NHCOCH_2OCOCH_3)\text{-}N(C_2H_5)_2$ | greenish blue |

We claim:
1. Dyestuff of the formula

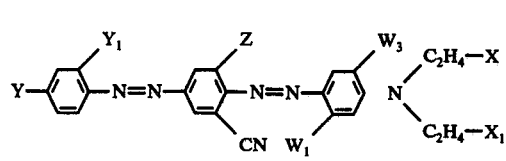

where
Y is H, Cl, $CH_3$, $NO_2$;
$Y_1$ is H, $CH_3$;
Z is $CH_3$, $OCH_3$, Cl, CN;
$W_1$ is H, $CH_3$, $NHCOCH_3$, $NHCOCH_2$—$OCOCH_3$;
$W_3$ is H or $OC_2H_5$;
X is H, $C_2H_5$, —$OCOOCH_3$ or $OCOCH_3$; and
$X_1$ is H, OH, $COOCH_3$, $OCOCH_3$ or $OCOOCH_3$.

2. Dyestuff of claim 1 of the formula

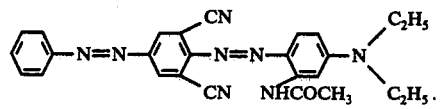

3. Dyestuff of claim 1 of the formula

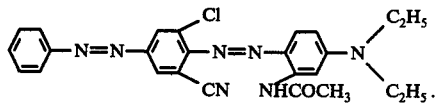

4. Dyestuff of claim 1 of the formula

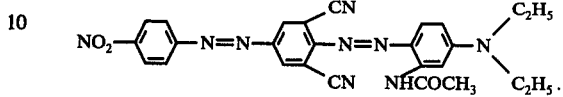

5. Dyestuff of the formula

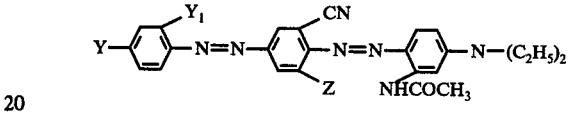

where
Z is $CH_3$, $OCH_3$, Cl, or CN;
Y is H, $CH_3$, or $NO_2$; and
$Y_1$ is H or $CH_3$.

* * * * *